United States Patent
Buckley et al.

(10) Patent No.: US 7,596,119 B2
(45) Date of Patent: Sep. 29, 2009

(54) METHOD AND SYSTEM FOR WIRELESS CHANNEL SELECTION BY A MOBILE DEVICE

(75) Inventors: Adrian Buckley, Brentwood, CA (US); Craig Dunk, Guelph (CA); Vytautas Robertas Kezys, Hamilton (CA); Russell Owen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 558 days.

(21) Appl. No.: 10/789,435

(22) Filed: Feb. 27, 2004

(65) Prior Publication Data

US 2005/0190782 A1   Sep. 1, 2005

(51) Int. Cl.
*H04J 3/16*   (2006.01)
(52) U.S. Cl. ..................... 370/331; 370/401
(58) Field of Classification Search ............. 455/442, 455/435, 436, 438, 445, 426; 370/331, 332, 370/355, 389, 400, 401, 390
See application file for complete search history.

(56) References Cited

U.S. PATENT DOCUMENTS

| | | | |
|---|---|---|---|
| 6,188,900 B1 | 2/2001 | Ruiz et al. | |
| 6,201,976 B1 * | 3/2001 | Rasanen | 455/557 |
| 6,401,113 B2 | 6/2002 | Lazaridis et al. | |
| 6,442,151 B1 * | 8/2002 | H'mimy et al. | 370/333 |
| 6,466,556 B1 | 10/2002 | Boudreaux | |
| 6,594,242 B1 | 7/2003 | Kransmo | |
| 6,603,751 B1 | 8/2003 | Odenwalder | |
| 6,741,858 B1 * | 5/2004 | Friman et al. | 455/436 |
| 7,058,017 B2 * | 6/2006 | Lee et al. | 370/238 |
| 2002/0105926 A1 | 8/2002 | Famolari et al. | |
| 2004/0028009 A1 | 2/2004 | Dorenbosch | |

FOREIGN PATENT DOCUMENTS

| | | |
|---|---|---|
| EP | 0888026 | 12/1998 |
| EP | 1 347 614 A2 | 9/2003 |
| EP | 1347614 | 9/2003 |
| GB | 2 288 301 A | 5/1994 |
| JP | 10-126856 | 5/1998 |

* cited by examiner

*Primary Examiner*—Sam Bhattacharya (57) ABSTRACT

A method and mobile device for performing wireless channel selection that employs more than one concurrent level 2 interface to facilitate a level 3 handoff. The method and device maintain an active service over a first level 3 connection through a first transceiver, establish a second level 3 connection through a second transceiver, and then switch the service over to the second connection. To establish an appropriate level 3 connection, the mobile device may evaluate candidate channels against criteria associated with the active service to ensure quality of service can be maintained over the new connection or may adapt the active service to a candidate channel.

27 Claims, 6 Drawing Sheets

METHOD AND SYSTEM FOR WIRELESS CHANNEL SELECTION BY A MOBILE DEVICE

FIELD OF THE INVENTION

The present invention relates to wireless mobile devices and, in particular, to a method and system for wireless channel selection by a mobile device.

BACKGROUND OF THE INVENTION

Many of the mobile devices available today provide complex functionality far beyond simple voice communications. For example, many devices enable a user to access remote servers or sites over a public network, like the Internet. Some of these devices permit users to engage in Voice-over-IP (VoIP) telephone calls. Other devices allow users to receive streaming data from remote resources, such as streaming video or audio data.

This greater level of functionality, especially the receipt of real-time streamed data, presents particular quality of service issues. For example, the mobile device must ensure that the streamed data—such as a VoIP call—is maintained during roaming. Accordingly, when roaming within a network from one base station or cell to another base station or cell, the network must provide for certain latency in the communications to ensure that there is sufficient time to negotiate a handoff of the call between base stations without introducing noticeable delay into the streamed data.

A particular difficulty arises when the device roams from one network to another network of a different type. For example, the mobile device may initiate and establish a call within a General Packet Radio System (GPRS) network and may subsequently move geographically into an area served by a wireless local area network (WLAN) or IEEE802.11 coverage. Existing mobile devices may not be able to maintain the service being conducted over the call when the device switches the call to the new network.

SUMMARY OF THE INVENTION

The present invention provides a method and mobile device for performing wireless channel selection that employs more than one concurrent level 2 interface to facilitate a level 3 handoff. The method and device maintain an active service over a first level 3 connection through a first transceiver, establish a second level 3 connection through a second transceiver, and then switch the service over to the second connection. To establish an appropriate level 3 connection, the mobile device may evaluate candidate channels against criteria associated with the active service to ensure quality of service can be maintained over the new connection. In some embodiments, the active service may be adapted to operate over a candidate channel having different characteristics from the existing channel.

In one aspect, the present invention provides a method of wireless channel selection by a mobile device, the mobile device communicating with a wireless network. The method includes steps of creating a first connection with the wireless network over a first channel; establishing a service between the mobile device and a remote point over the first connection; creating a second connection with the wireless network over a second channel; switching the service to the second connection; and terminating the first connection.

In another aspect the present invention provides a mobile device for wireless channel selection, the mobile device communicating with a wireless network. The mobile device includes a first transceiver for creating a first connection with the wireless network over a first channel; a second transceiver for creating a second connection with the wireless network over a second channel; and a switching module coupled to the first and second transceivers and directing the first transceiver to create the first connection, establishing a service between the mobile device and a remote point over the first connection, selecting the second channel, and directing the second transceiver to create the second connection; wherein, upon creation of the second connection, the switching module switches the service from the first connection to the second connection.

In a further aspect, the present invention provides a method of wireless channel selection by a mobile device, the mobile device communicating with a wireless network, and having a first connection with the wireless network over a first channel, the first connection supporting an active service between the mobile device and a remote point. The method includes the steps of selecting a second channel from a set of candidate channels based upon characteristics of the candidate channels and service criteria associated with the active service; creating a second connection with the wireless network over the second channel; switching the active service to the second connection; and terminating the first connection.

In yet another aspect, the present invention provides a mobile device for wireless channel selection, the mobile device communicating with a wireless network. The mobile device includes a first transceiver for creating a first connection with the wireless network over a first channel; a second transceiver for creating a second connection with the wireless network over a second channel; a memory for storing characteristics for at least one candidate channel and storing service criteria for an active service between the mobile device and a remote point; and a switching module coupled to the first and second transceivers and to the memory, the switching module selecting the second channel based upon an evaluation of the characteristics of the at least one candidate channel against the service criteria, and wherein the switching module switches the service from the first connection to the second connection.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DESCRIPTION OF SPECIFIC EMBODIMENTS

The following description of one or more specific embodiments of the invention does not limit the implementation of the invention to any particular computer programming language or system architecture. The present invention is not limited to any particular operating system, mobile device architecture, or computer programming language.

The following description makes reference to choosing a channel or operating a service over a channel. It will be understood that the term channel and the notion of selecting a channel is meant to encompass the selection of a channel from among different frequencies and/or channels.

Figure 1:
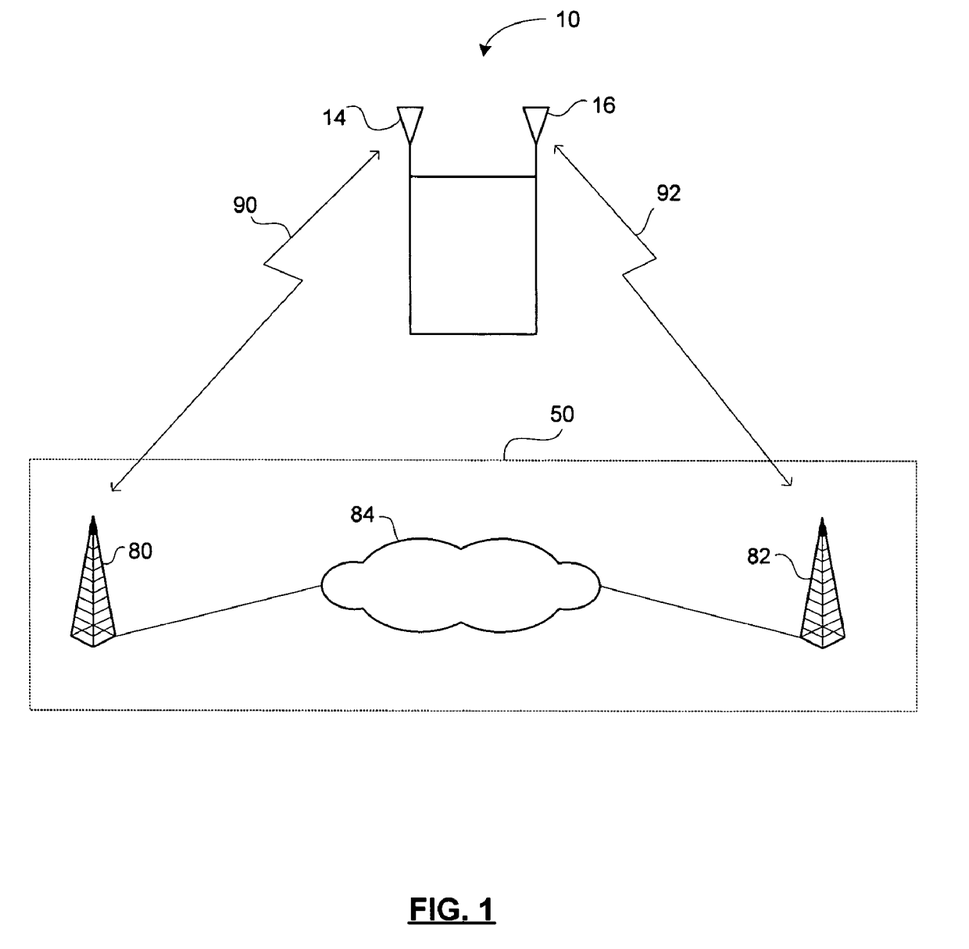
FIG. 1 shows a block diagram of an embodiment of a mobile device and a wireless communication network.

Reference is first made to FIG. 1, which shows a mobile device 10 and a wireless communication network 50. The wireless communication network 50 includes a first base station 80 and a second base station 82 coupled to a core network 84. The core network 84 may include a collection of interconnected networks of different types. For example, the core network 84 may include a GPRS network coupled to a WLAN and to the Internet. It will be appreciated by those of ordinary skill in the art that the core network 84 may include a variety of other interconnected networks.

The mobile device 10 includes a first transceiver 14 and a second transceiver 16. The mobile device 10 is capable of establishing communications with the wireless communication network 50. For example, the first transceiver 14 may have a first link 90 with the first base station 80 and the second transceiver 16 may have a second link 92 with the second base station 82.

Under normal operations, the mobile device 10 employs one of the transceivers 14, 16 to establish and maintain a link with a base station 80, 82. This link is used to maintain a communication service, such as, for example, a voice call. Accordingly, the mobile device 10 establishes a level 2 (L2) connection to the wireless communication network 50 over the link 90 or 92 and then establishes a level 3 (L3) connection with an administrative domain to create the communication service. For example, the first transceiver 14 may have an active service over the first link 90 to the first base station 80, such as a VoIP session. This service operates over an L3 connection between the mobile device 10 and a remote location within the wireless communication network 50 using the first link 90.

The mobile device 10 may determine that it has moved into an area better served by another base station, in which case it will attempt to locate an alternative link to another base station. The mobile device 10 may make this decision as a result of signal strength monitoring according to the appropriate standard, as will be understood by those of ordinary skill in the art. The mobile device 10 may locate an available channel on the second base station 82 by scanning or through broadcast information received from the first base station 80. Once the mobile device 10 has located an alternative channel, the mobile device 10 tunes to that new channel and obtains broadcast information from the second base station 82. There may be multiple candidate channels.

Based on the broadcast information regarding the new channel, the mobile device 10 determines if the channel is available. The mobile device 10 also evaluates the characteristics of the channel against the type of service currently operating on the mobile device. The type of service may dictate that certain minimum channel characteristics are required from any candidate channel in order to maintain the service. For example, the type of service may be a high bandwidth service. In this case, a low bandwidth channel would be inappropriate. Other factors including cost and reachability may also factor into the decision. Reachability refers to the ability to reach the same entity within the wireless communication network 50 that is providing the active service.

Once the new channel is approved by the mobile device 10, the mobile device 10 requests resources from the wireless communications network 50. In other words, the mobile device 10 requests L2 and L3 connectivity. If resources are granted establishing a second link 92, then the mobile device 10 assesses whether the granted resources are sufficient to operate the service. If the resources are sufficient, then the existing service being operated over the first link 90 is switched to the second link 92.

In another embodiment, the second link 92 has characteristics different from the first link 90, such as a lower bandwidth or longer mean latency. The mobile device 10 may adapt the service to operate over the second link 92. In other words, the service is modified based upon the characteristics of the new channel. The adaptation may include changing the codec(s) used with regard to the service. For example, a service that involves audio and/or video may be modified to consume less bandwidth by modifying the codec used for the audio and/or the video, or by dropping the video and transmitting the audio only. It will be understood that other modification could be made to the service to ensure it operates successfully over a new channel having different characteristics.

Figure 2:
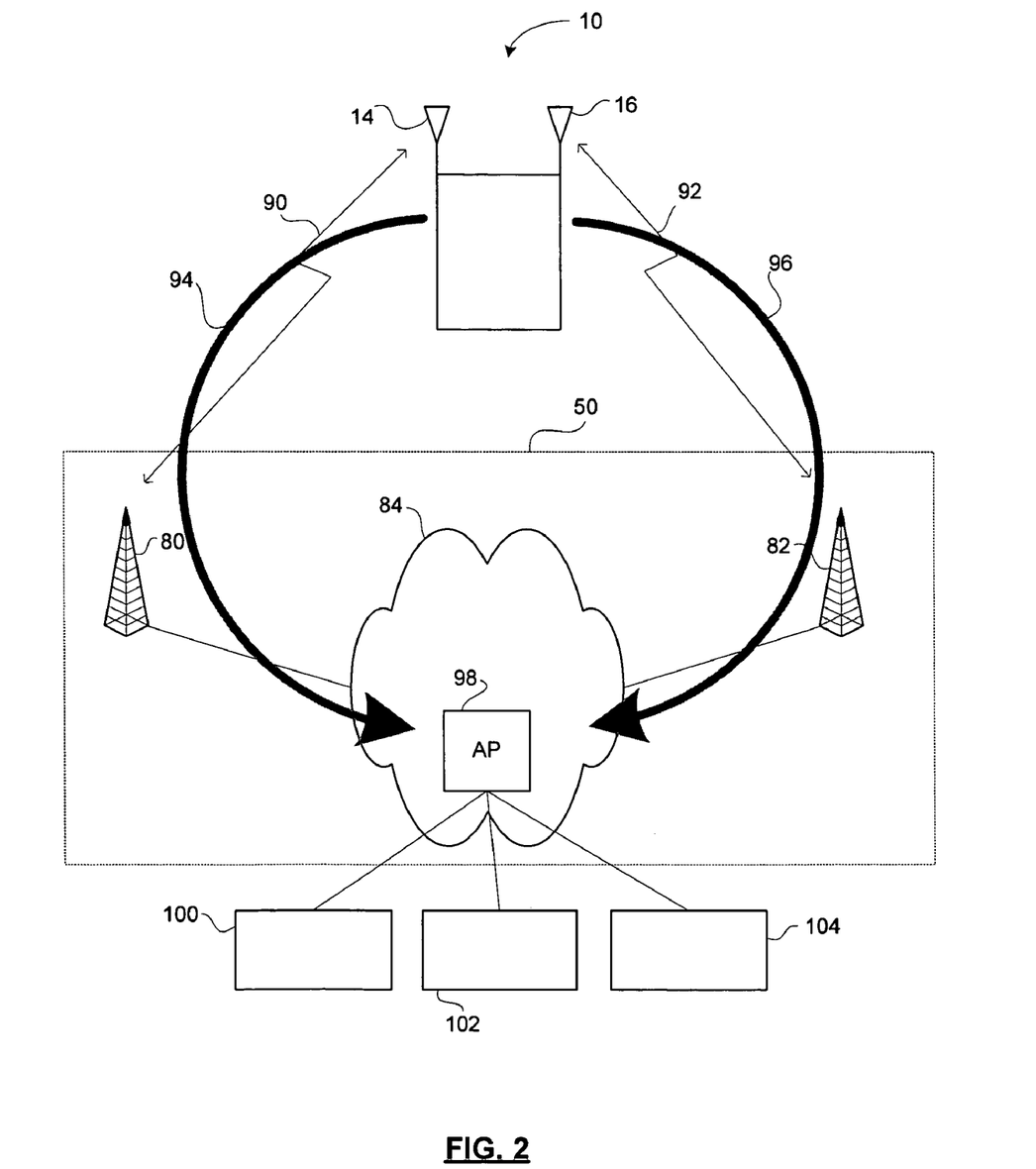
FIG. 2 which shows the block diagram of FIG. 1 in a roaming context.

Reference is made to FIG. 2, which shows the block diagram of FIG. 1 in a roaming context. The core network 84 includes an anchor point 98. The anchor point 98 may be a router, server, or other node within the wireless communication network 50.

The anchor point 98 is coupled to one or more servers 100, 102, 104 that support a communication service. In another embodiment, the anchor point 98 is one of the servers 100, 102, or 104 providing a communication service. The communication service is represented by a first data stream 94 over the first link 90 to the anchor point 98. The anchor point 98 processes the first data stream 94 and transmits it to one or more of the servers 100, 102, 104.

When the mobile device 10 requests network resources to establish the second link 92, it seeks to establish a connection to the anchor point 98. In order to create the second link 92 and establish an L3 connection to support the transfer of the communication service, the mobile device 10 may require the allocation of an IP address to facilitate communication of packets from the anchor point 98 to the mobile device 10 over the second link 92. The request for resources may also incorporate authentication steps, authorization steps, and ensuring that there is sufficient bandwidth and that the level of latency is acceptable.

If these resources are granted, and if the mobile device 10 determines that the resources are adequate for supporting the existing communication service, then a second data stream 96 is established to support the communication service.

Accordingly, by establishing overlapping L2 connectivity, the mobile device 10 is able to select and obtain resources over a new channel and move a service over to the new channel without losing L3 connectivity. This minimizes latency in the handoff.

Figure 3:
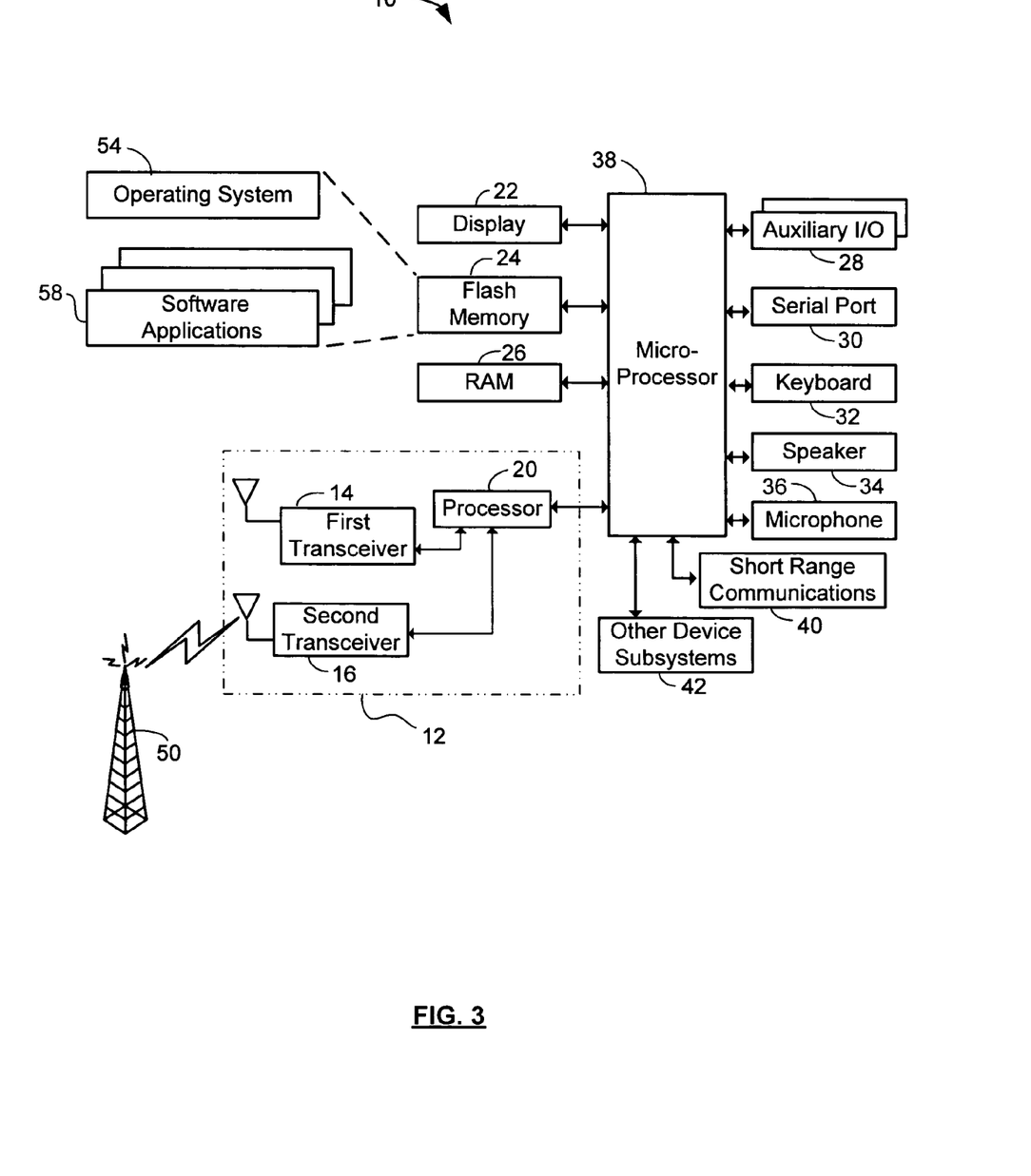
FIG. 3 shows a block diagram of an embodiment of the mobile device.

Reference is now made to FIG. 3, which shows a block diagram of the mobile device 10 in an example embodiment. In this embodiment, the mobile device 10 has data and possibly also voice communication capabilities. In an example embodiment, the mobile device 10 has the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things.

In this embodiment, the mobile device 10 includes a communication subsystem 12, including a first transceiver 14, a second transceiver 16, and associated components such as a processor 20, which in one embodiment includes a digital signal processor (DSP). In some embodiments, the communication subsystem includes local oscillator(s) (LO) (not shown), and in some embodiments the communication subsystem 12 and a microprocessor 38 share an oscillator. As will be apparent to those skilled in the field of communications, the particular design of the communication subsystem 12 will be dependent upon the communication network in which the device is intended to operate. The transceivers 14, 16 may have separate antennae or may share an antenna.

Signals received by the antenna through the wireless communication network 50 are input to one of the transceivers 14 or 16, which may perform such common transceiver functions as signal amplification, frequency down conversion, filtering, and the like. In a similar manner, signals to be transmitted are processed, including modulation and encoding for example, by the processor 20 and input to one of the transceivers 14 or 16 for frequency up conversion, filtering, amplification and transmission over the wireless communication network 50.

The device 10 includes the microprocessor 38 that controls the overall operation of the device. The microprocessor 38 interacts with communications subsystem 12 and also interacts with further device subsystems such as the display 22, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of software applications 58 which control basic device operations, including at least data and voice communication applications for example, will normally be installed on the device 10 during manufacture. Further software applications 58 may also be loaded onto the device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 12 and input to the microprocessor 38, which will preferably further process the received signal for output to the display 22, or alternatively to an auxiliary I/O device 28. A user of device 10 may also compose data items within a software application 58, such as email messages for example, using the keyboard 32 in conjunction with the display 22 and possibly an auxiliary I/O device 28. Such composed items may then be transmitted over a communication network through the communication subsystem 12.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through the wireless communication network 50.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

Wireless communication network 50 is, in an example embodiment, a wireless packet data network, (e.g. Mobitex™ or DataTAC™), which provides radio coverage to mobile devices 10. Wireless communication network 50 may also be a voice and data network such as GSM (Global System for Mobile Communication), GPRS, CDMA (Code Division Multiple Access), or various other third generation networks such as EDGE (Enhanced Data rates for GSM Evolution) or UMTS (Universal Mobile Telecommunications Systems).

Figure 4:
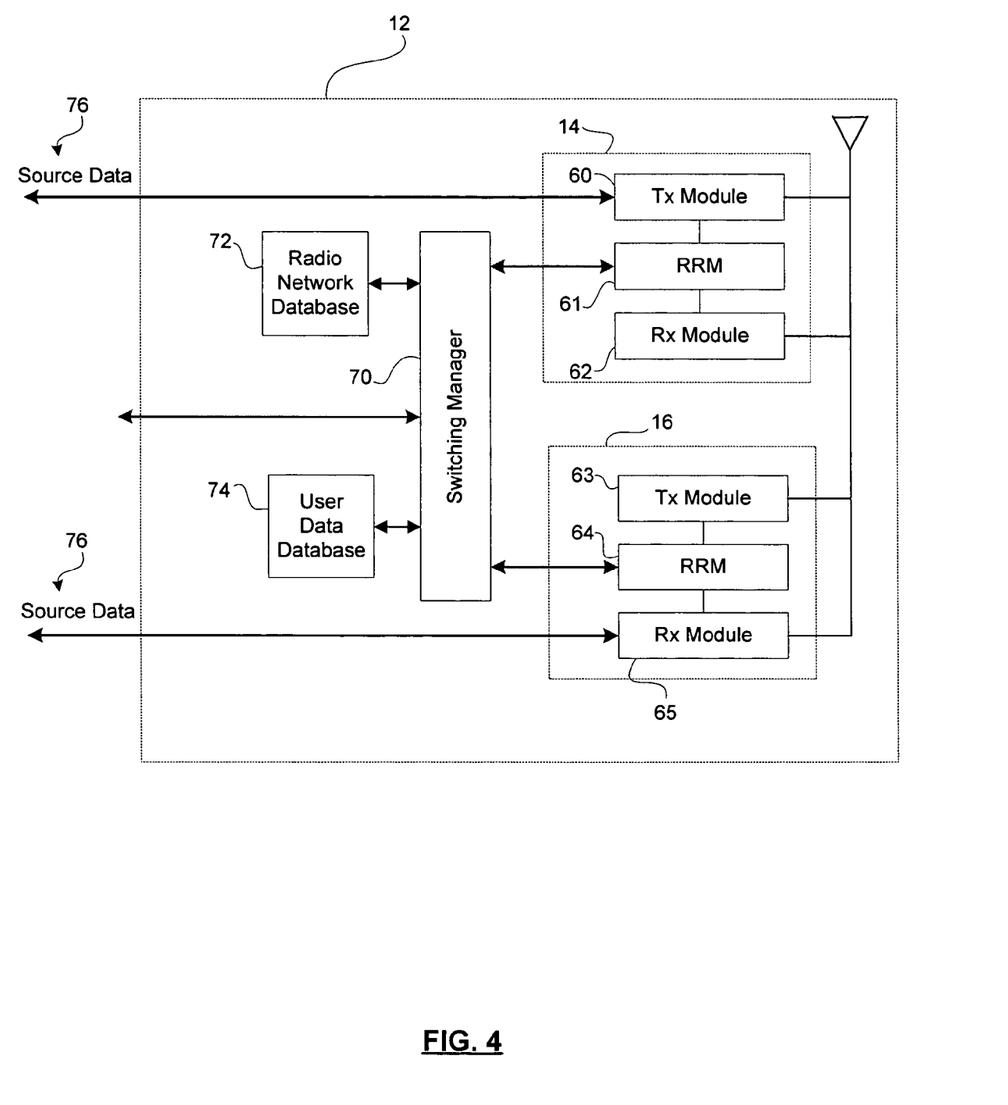
FIG. 4 shows a block diagram of an embodiment of a communication subsystem for the mobile device of FIG. 3.

Reference is now made to FIG. 4, which shows a block diagram of an embodiment of the communication subsystem 12. In addition to the first transceiver 14 and the second transceiver 16, the communications subsystem 12 includes a switching manager 70, a radio network database (RND) 72, and a user data database (UDD) 74. The first and second transceivers 14, 16 each include a transmit module 60, 63, a receive module 62, 65, and a radio resource sub-layer manager (RRM) 61, 64.

The switching manager 70 manages the connections between the mobile device 10 (FIG. 1) and the wireless communication network 50 (FIG. 1). The switching manager 70 requests dedicated resources for establishing data transfer and for coordinating information received on one or both of the transceivers 14, 16. It alerts one of the transceivers 14 or 16 when it is necessary to search for a new channel. The switching manager 70 also directs whether the source data 76 should go to the first or second transceiver 14, 16 for transmission. It may also perform mobility management functions, such as authentication.

The radio network database 72 stores information about the candidate channels that have been located and any broadcast information located. It may also store signal strength information. Accordingly, the radio network database 72 maintains up-to-date records of the potential channels and their characteristics.

The user data database 74 stores information regarding the attributes to be used in selecting a channel. These attributes may include signal strength, minimum bandwidth, mean bandwidth, minimum latency, mean latency, maximum latency, security settings, technology types, and other attributes.

Each radio resource sub-layer manager (RRM) 61, 64 is responsible for radio link control and medium access control (RLC/MAC). The RRMs 61, 64 instruct the receiver modules 63, 65 to scan the appropriate frequency bands. When a compatible channel is located, the RRM 61, 64 locates its broadcast information. If the broadcast information advertises any neighbour channels, then the RRM 61, 64 instructs the receiver module 63, 65 to tune to those channels as well to obtain their signal strengths and broadcast information. The RRM passes the information that it gathers from the located channels on to the switching manager 70, which then stores the information in the radio network database 72. The RRMs 61, 64 dynamically update the information in the radio network database 72 as the signal strengths of located channels change.

It will be understood that the various parts of the communication subsystem 12 shown in the block diagram of FIG. 4 may be implemented by various other parts or subsystems shown in the block diagram of FIG. 3. For example, the UDD 74 or the RND 72 may be stored within flash memory 24 (FIG. 3) or within RAM 26 (FIG. 3). The switching manager 70 may be implemented through the microprocessor 38 or through a dedicated purpose element, such as the processor 20.

The switching manager 70 selects the channel to be used for communications and sends control information to one of the transceivers 14, 16 instructing it to tune to the selected channel. The switching manager 70 also sends (via one of the transceivers 14,16) a request for resources. Once resources are granted, the switching manager 70 directs that the source data 76 should go to the tuned transceiver 14 or 16.

Figure 5:
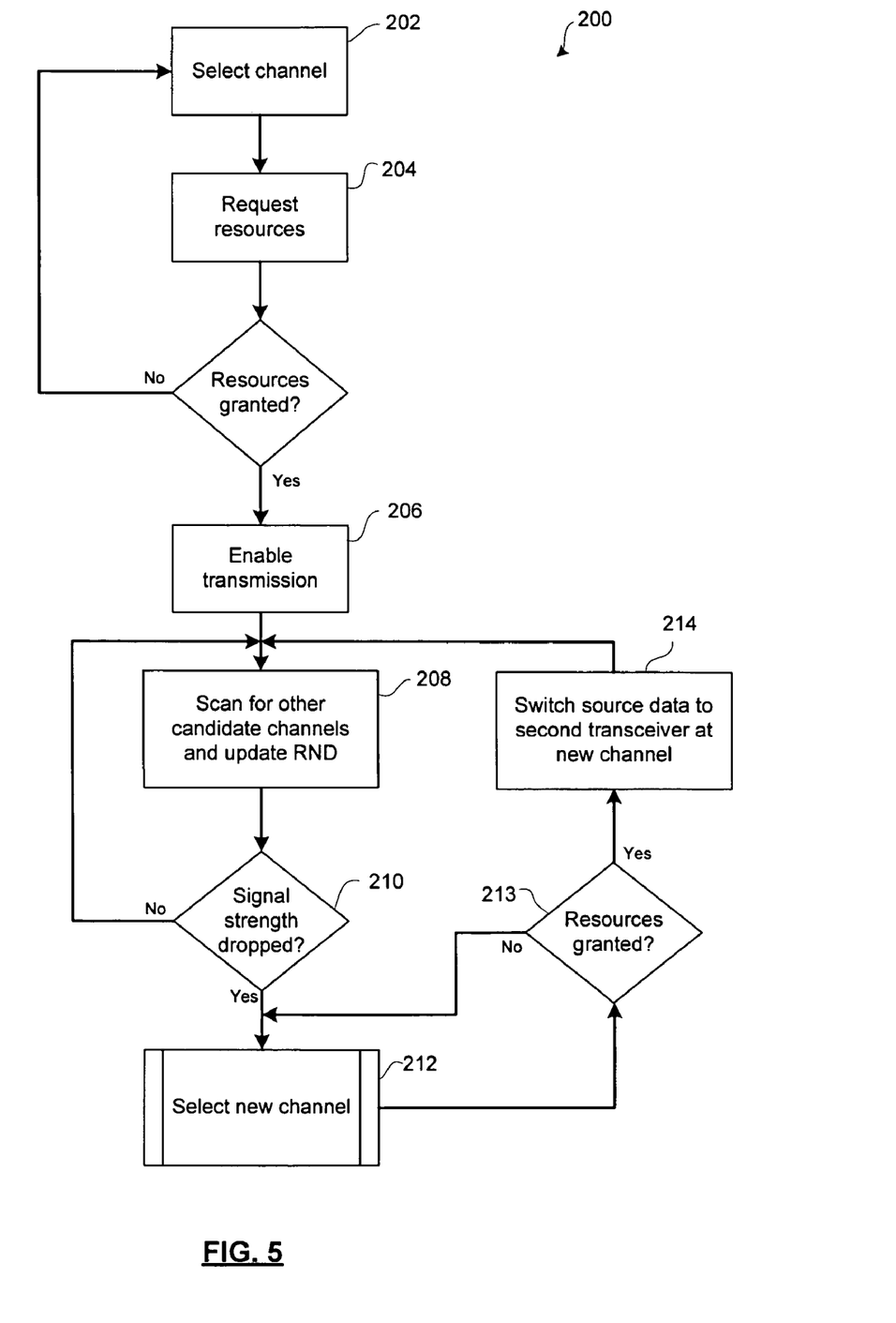
FIG. 5 shows, in flowchart form, a method of wireless channel selection by a mobile device.

Reference is now made to FIG. 5 in conjunction with FIG. 4. FIG. 5 shows, in flowchart form, a method 200 for wireless channel selection in accordance with the present invention. The method 200 begins in step 202, wherein the switching manager 70 selects one of the available channels and instructs the first transceiver 14 to tune to the selected channel. The switching manager 70 then sends a request for resources to the wireless communication network 50 in step 204 using the first transceiver 14. If the wireless communication network 50 grants the resources, then in step 206 the source data 76 is directed to the first transceiver 14 for transmission.

While a communication service, such as a VoIP call or other service, is established using the link set-up over the selected channel using the first transceiver 14, the second transceiver 16 is scanning the environment for alternative channels in step 208. The second transceiver 16 may scan any of the channels that were originally located by the first transceiver 14 or it may locate additional or new channels. It provides updated channel information to the switching manager 70 for storage in the radio network database 72. If the second transceiver 72 notes that previously located channels have become unavailable, due to loss of signal strength or loss of availability, then it will notify the switching manager 70 and the information in the radio network database 72 is updated accordingly. Those channels that become unavailable are marked as such and are later dropped altogether from the radio network database 72 if they are not relocated within a reasonable period of time.

While the second transceiver 16 scans available channels and the radio network database 72 is updated, the first transceiver 14 conducts signal strength monitoring on the selected channel over which the service is operating. If, in step 210, the first transceiver 14 detects that the signal strength has dropped below a threshold defined by the appropriate standard, then the method 200 proceeds to step 212 to select a new channel.

In steps 212, 213 and 214, the switching manager 70 selects a new candidate channel and instructs the second transceiver 16 to tune to the new channel. Once the second transceiver 16 has located the new channel it informs the switching manager 70 and the switching manager 70 sends a request for resources from the wireless communication network 50 (FIG. 1). Obtaining resources includes obtaining the necessary bearer channel, which includes establishing a level 3 network connection with the anchor point 98 (FIG. 2). The anchor point 98 is a point in the core network 84 (FIG. 2) that is already processing the first data stream 94 (FIG. 2) for the service operating over the first link 90 (FIG. 2). The anchor point 98 may be the server providing the service or may be an intermediate point in the core network 84. Establishing a level 3 network connection with the anchor point 98 may include allocation of a new IP address to the mobile device that may differ from the IP address used for the first link 90. Accordingly, if resources are granted, then the mobile device 10 will have two concurrent level 3 communication paths established with the wireless communication network 50.

If resources are granted, then the switching manager 70 causes the source data 76 to be routed to the second transceiver 16 for transmission.

If resources are not granted, then the switching manager 70 selects a new candidate channel and repeats the attempt to obtain resources.

Figure 6:
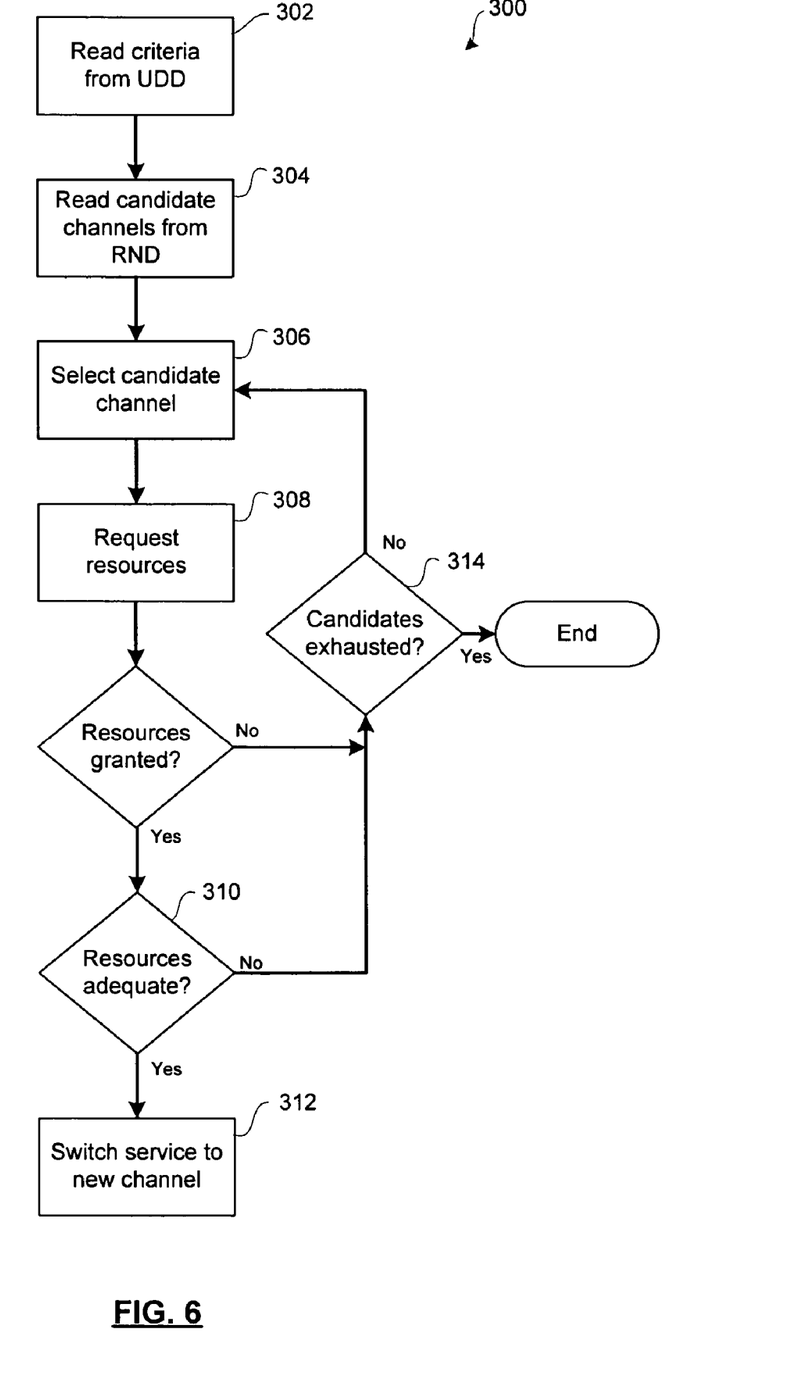
FIG. 6 shows, in flowchart form, a method of selecting a new candidate channel and switching a service to the new channel.

The steps of selecting a new channel and switching a service to that new channel shown in steps 212, 213 and 214 are shown in greater detail in FIG. 6, which shows in flowchart form a method 300 of selecting a new candidate channel and switching a service to the new channel.

The method 300 begins when the switching manager 70 (FIG. 4) decides to select a new channel, such as for example in response to a drop in signal strength on a channel currently in use. In step 302, the switching manager 70 reads selection criteria from the user data database 74 (FIG. 4). The selection criteria reflect the channel characteristics necessary to maintain a certain quality of service based upon the type of service. The selection criteria may include the type of service being operated on the mobile device 10 (i.e. VoIP, streaming video, simple e-mail, etc.), the bandwidth requirements associated with the type of service (i.e. minimum bandwidth requirements for maintaining certain quality of service (QoS) standards), and any other channel characteristics associated with the type of service. Other channel characteristics may include latency associated with the link, security settings available, and technology types (i.e. WLAN, GPRS, EDGE, W-CDMA, etc.).

In step 304, the switching manager 70 consults the radio network database 72 (FIG. 4) to determine which candidate channels are available. From among the candidate channels, the switching manager 70 selects a first candidate in step 306. The selection may be based upon a comparison of the characteristics of the channel stored in the radio network database 72 and the channel requirements provided by the user data database 74. Alternatively, the candidate channels stored in the radio network database 72 may be pre-filtered by the switching manager 70 against the channel requirements during the regular updating of the radio network database 72. In such an embodiment, the radio network database 72 would only contain candidate channels that appear to meet the channel requirements. Therefore, the switching manager 70 may select any one of the candidate channels. An appropriate algorithm may be employed to select from among multiple candidate channels. The algorithm may take into account bandwidth, signal strength, and any other characteristic information regarding the candidate channel.

Having selected a candidate channel, in step 308, the switching manager 70 instructs the second transceiver to locate the candidate channel and sends a request for resources to the wireless network 50. If resources are refused then the switching manager 70 tries the next candidate channel. If resources are granted, then in step 310 the switching manager 70 may compare the granted resources against the channel requirements obtained in step 302 and may accept or reject the candidate channel. If the channel is rejected, then the switching manager 70 tries the next candidate channel.

If the resources granted are adequate, then in step 312 the service is switched to the newly established connection over the new candidate channel. Once the service has been switched to the new channel using the second transceiver 16 (FIG. 1), the connection using the first transceiver 14 (FIG. 1) is dropped and the first transceiver 14 assumes the role of scanning for new candidate channels and updating the radio network database 72. The overlapping level 3 connectivity that results from the method 300 provides for a low latency handoff of the service.

In step 314, if the candidate channels have been exhausted without finding an acceptable channel, then the handoff fails and the service remains on the original channel.

In another embodiment, if the candidate channels and/or the resources granted are insufficient to meet the service criteria, then the switching manager 70 may direct that the service be altered or adapted to function over the available channels. For example, a service involving streaming video data may need to be changed to streaming audio only or streaming video at a lower resolution or refresh rate in order to function appropriately over a narrower bandwidth connection.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of wireless channel selection by a mobile device, the mobile device communicating with a wireless network, comprising the steps of:
    creating a first connection with the wireless network over a first channel;
    establishing a service between the mobile device and a remote point over said first connection;
    creating a second connection with the wireless network over a second channel, wherein said step of creating includes selecting said second channel and evaluating characteristics of said second channel against service criteria associated with said service; wherein said characteristics of said second channel do not meet said service criteria;
    adapting said service to said characteristics of said second channel;
    switching said service to said second connection; and
    terminating said first connection.

2. The method claimed in claim 1, wherein said characteristics include bandwidth and said service criteria include a minimum bandwidth requirement.

3. The method claimed in claim 1, wherein said characteristics include latency and said service criteria include a latency requirement.

4. The method claimed in claim 1, wherein said step of creating a second connection includes steps of selecting said second channel and requesting resources from the wireless network.

5. The method claimed in claim 4, wherein the wireless network includes an anchor point and wherein said first connection includes a first path to said anchor point, and wherein said step of creating a second connection includes establishing a second path to said anchor point.

6. The method claimed in claim 1, wherein said characteristics include mean bandwidth and said service criteria include a mean bandwidth requirement.

7. The method claimed in claim 1, wherein said characteristics include security settings and said service criteria include security settings requirements.

8. The method claimed in claim 1, wherein said service includes audio and video, and wherein said step of adapting includes dropping said video to transmit said audio only.

9. The method claimed in claim 1, wherein said service includes the transmission of encoded media and wherein said step of adapting includes modifying a codec used to encode and decode said encoded media.

10. A mobile device for wireless channel selection, the mobile device communicating with a wireless network, comprising:
    a first transceiver for creating a first connection with the wireless network over a first channel;
    a second transceiver for creating a second connection with the wireless network over a second channel;
    a memory, said memory containing a list of candidate channels and their characteristics and containing service criteria associated with a service; wherein characteristics of said second channel do not meet said service criteria; and
    a switching module coupled to the first and second transceivers, said switching module directing said first transceiver to create said first connection, establishing said service between the mobile device and a remote point over said first connection, selecting said second channel, adapting said service to said characteristics of said second channel, and directing said second transceiver to create said second connection;
    wherein said switching module reads said list of candidate channels and compares their characteristics against said service criteria to select said second channel and wherein said switching module switches said service from said first connection to said second connection.

11. The mobile device claimed in claim 10, wherein said switching module directs said first transceiver to terminate said first connection once said service is switched to said second connection.

12. The mobile device claimed in claim 10, wherein said characteristics include bandwidth and said service criteria include a minimum bandwidth requirement.

13. The mobile device claimed in claim 10, wherein said characteristics include latency and said service criteria include a latency requirement.

14. The mobile device claimed in claim 10, wherein said switching module outputs a request for resources to said second transceiver for transmission to the wireless network to establish said second connection.

15. The mobile device claimed in claim 14, wherein the wireless network includes an anchor point and wherein said first connection includes a first path to said anchor point, and wherein said second connection includes a second path to said anchor point.

16. The mobile device claimed in claim 10, wherein said characteristics include mean bandwidth and said service criteria include a mean bandwidth requirement.

17. The mobile device claimed in claim 10 wherein said characteristics include security settings and said service criteria include security settings requirements.

18. The mobile device claimed in claim 10, wherein said service includes audio and video, and wherein said switching module adapts said service by dropping said video to transmit said audio only.

19. The mobile device claimed in claim 10, wherein said service includes the transmission of encoded media and wherein said switching module adapts said service by modifying a codec used to encode and decode said encoded media.

20. A method of wireless channel selection by a mobile device, the mobile device communicating with a wireless network, and having a first connection with the wireless network over a first channel, the first connection supporting an active service between the mobile device and a remote point, the method comprising the steps of:
    selecting a second channel from a set of candidate channels based upon characteristics of said candidate channels and service criteria associated with said active service wherein said characteristic of said second channel do not meet said service criteria;
    creating a second connection with the wireless network over said second channel;
    adapting said active service to said characteristics of said second channel;
    switching said active service to said second connection; and
    terminating said first connection.

21. The method claimed in claim 20, wherein said step of creating a first connection and said step of creating a second connection include creating a first level 3 connection and creating a second level 3 connection, respectively, and wherein said step of switching includes switching at level 3.

22. The method claimed in claim 20, wherein said characteristics include bandwidth and said service criteria include a minimum bandwidth requirement.

23. The method claimed in claim 20, wherein said characteristics include latency and said service criteria include a latency requirement.

24. A mobile device for wireless channel selection, the mobile device communicating with a wireless network, the mobile device comprising:
    a first transceiver for creating a first connection with the wireless network over a first channel;
    a second transceiver for creating a second connection with the wireless network over a second channel;
    a memory for storing characteristics for at least one candidate channel and storing service criteria for an active service between the mobile device and a remote point wherein characteristics of said second channel do not meet said service criteria; and
    a switching module coupled to the first and second transceivers and to said memory, said switching module selecting said second channel based upon an evaluation of said characteristics of said at least one candidate channel against said service criteria, wherein said switching module adapts said active service set to said characteristics and wherein said switching module switches said service from said first connection to said second connection.

25. The mobile device claimed in claim 24, wherein said switching module directs said first transceiver to terminate said first connection once said active service is switched to said second connection.

26. The mobile device claimed in claim 24, wherein said characteristics include bandwidth and said service criteria include a minimum bandwidth requirement.

27. The mobile device claimed in claim 24, wherein said characteristics include latency and said service criteria include a latency requirement.

* * * * *